(12) United States Patent
Baer et al.

(10) Patent No.: US 7,461,191 B2
(45) Date of Patent: Dec. 2, 2008

(54) SEGMENTED ON-CHIP MEMORY AND REQUESTER ARBITRATION

(75) Inventors: Matthias Baer, Dresden (DE); Falk Tischer, Riesa (DE); Oliver Goetting, Dresden (DE); Peer Schlegel, Chemnitz (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 249 days.

(21) Appl. No.: 11/106,766

(22) Filed: Apr. 15, 2005

(65) Prior Publication Data
US 2006/0047910 A1 Mar. 2, 2006

(30) Foreign Application Priority Data
Aug. 31, 2004 (DE) .................. 10 2004 042 172

(51) Int. Cl.
G06F 12/00 (2006.01)
H04Q 7/24 (2006.01)

(52) U.S. Cl. .................. 710/242; 370/913; 370/338; 711/209

(58) Field of Classification Search ............ 365/230.03; 711/5, 149, 209; 710/242; 370/338, 913
See application file for complete search history.

(56) References Cited

U.S. PATENT DOCUMENTS

| | | | | |
|---|---|---|---|---|
| 4,415,972 A * | 11/1983 | Adcock | ............ | 710/200 |
| 4,423,480 A * | 12/1983 | Bauer et al. | ............ | 710/100 |
| 4,761,736 A * | 8/1988 | Di Orio | ............ | 711/2 |
| 5,222,062 A * | 6/1993 | Sharma et al. | ............ | 370/218 |
| 5,392,448 A * | 2/1995 | Frankel et al. | ............ | 712/35 |
| 5,400,293 A * | 3/1995 | Iguchi et al. | ............ | 365/230.03 |
| 5,408,627 A * | 4/1995 | Stirk et al. | ............ | 711/151 |
| 5,577,229 A * | 11/1996 | Wakerly | ............ | 711/147 |
| 6,122,267 A * | 9/2000 | Abiven et al. | ............ | 370/338 |
| 6,122,759 A * | 9/2000 | Ayanoglu et al. | ............ | 714/57 |
| 6,198,728 B1 * | 3/2001 | Hulyalkar et al. | ............ | 370/310.1 |
| 6,272,140 B1 * | 8/2001 | LaRowe et al. | ............ | 370/403 |
| 6,434,620 B1 * | 8/2002 | Boucher et al. | ............ | 709/230 |

(Continued)

FOREIGN PATENT DOCUMENTS

EP 294499 A1 * 12/1988

(Continued)

OTHER PUBLICATIONS

Microsoft Press Computer dictionart second edition 1994 p. 352.*

(Continued)

*Primary Examiner*—Paul R Myers
(74) *Attorney, Agent, or Firm*—Meyertons Hood Kivlin Kowert & Goetzel, P.C.

(57) ABSTRACT

A memory access technique is provided that may be used in WLAN (Wireless Local Area Network) communication devices. An on-chip memory has multiple memory circuits forming individually addressable memory segments. An arbitration unit arbitrates between multiple requesters, each requesting access to the on-chip memory. The requesters are on-chip circuits and/or external devices. The arbitration unit determines a memory circuit to be accessed for each request that is received from a requester. The determination may be based on a software configurable arbitration scheme. The memory segments may form a bank of single-port SRAM (Static Random Access Memory) devices.

73 Claims, 4 Drawing Sheets

U.S. PATENT DOCUMENTS

| | | |
|---|---|---|
| 6,732,218 B2 | 8/2002 | Boucher et al. |
| 6,475,146 B1 * | 11/2002 | Frelburger et al. .......... 600/437 |
| 6,584,080 B1 * | 6/2003 | Ganz et al. .................. 370/315 |
| 6,600,734 B1 * | 7/2003 | Gernert et al. .............. 370/352 |
| 6,625,709 B2 * | 9/2003 | Aiken et al. ................ 711/170 |
| 6,970,446 B2 * | 11/2005 | Krischer et al. ............ 370/338 |
| 2002/0120822 A1 | 8/2002 | Li et al. |
| 2003/0021262 A1 * | 1/2003 | Ma et al. .................... 370/352 |
| 2004/0024947 A1 * | 2/2004 | Barth et al. ................ 710/310 |
| 2005/0144402 A1 * | 6/2005 | Beverly ...................... 711/152 |
| 2005/0216616 A1 * | 9/2005 | Eldar et al. .................. 710/52 |

FOREIGN PATENT DOCUMENTS

| | | | |
|---|---|---|---|
| EP | 1085423 A2 * | 3/2001 | |
| WO | WO 9515528 A1 * | 6/1995 | |
| WO | 2004/029817 | 4/2004 | |

OTHER PUBLICATIONS

Translation into English of: Office Action, Application No. 10 2005 09 021.4-53, Dec. 7, 2005.

Translation of Official Office Action application No. DE 10 2004 042 172.2-53 mailed Jun. 8, 2005.

Translation of Official Communication for German application No. 10 2004 042 172.2; entitled "Segmented on-chip memory and requester arbitration" 4pp.

* cited by examiner

SEGMENTED ON-CHIP MEMORY AND REQUESTER ARBITRATION

BACKGROUND OF THE INVENTION

1. Field of the Invention

The invention generally relates to WLAN (Wireless Local Area Network) communication devices, integrated circuit chips, memory devices and corresponding methods, and more particularly to techniques for controlling access to an on-chip memory.

2. Description of the Related Art

A wireless local area network is a flexible data communication system implemented as an extension to or as an alternative for a wired LAN. Using radio frequency or infrared technology, WLAN systems transmit and receive data over the air minimizing the need for wired connections. Thus, WLAN systems combine data connectivity with user mobility.

Today, most WLAN systems use spread spectrum technology, a wideband radio frequency technique developed for use in reliable and secure communication systems. The spread spectrum technology is designed to trade-off bandwidth efficiency for reliability, integrity and security. Two types of spread spectrum radio systems are frequently used: frequency-hopping and direct sequence systems.

The standard defining and governing wireless local area networks that operate in the 2.4 GHz spectrum is the IEEE 802.11 standard. To allow higher data rate transmissions, the standard was extended to 802.11b which allows data rates of 5.5 and 11 Mbps in the 2.4 GHz spectrum. Further extensions exist.

When using wireless communication techniques, various data encryption schemes may be applied. For instance, AES (Advanced Encryption Standard) is a data encryption scheme which uses three different key sizes (128-bit, 192-bit, and 256-bit) but only one encryption step to encrypt data in 128-bit blocks. The AES mechanism is based upon the Rijndael algorithm.

Another data encryption scheme that may be applied in wireless communication systems is TKIP (Temporal Key Integrity Protocol) which is part of the IEEE 802.11i encryption standard for WLAN systems. TKIP is the next generation of WEP (Wired Equivalency Protocol) which is used to secure 802.11 wireless networks. TKIP provides per-packet key mixing, a message-integrity check, and a re-keying mechanism.

When using modern wireless communication systems, for instance those which are 802.11b/i compliant, the devices need to meet the protocol timing even when using slow target interfaces such as SDIO (Secure Digital Input/Output) or CF (Compact Flash). SD cards are small media-type devices that have extra connections to secure data. SDIO slots accept not only memory but also expansion hardware for Bluetooth, wireless communications, and other purposes. CF is a 50-pin connection standard used in some PDAs (Personal Digital Assistants), digital cameras, hardware MP3 (MPEG-1 layer 3 audio encoding, Motion Picture Expert Group) players and other small devices. It was initially designed to offer PCM-CIA-ATA (Personal Computer Memory Card International Association, Advanced Technology Attachment) standard access to flash memory in a smaller form factor. The standard is now also used for other purposes.

For bringing together fast timing schemes (such as those which are 802.11b/i protocol compliant) with slow target interfaces (such as SDIO, CF and others), data buffering is an option to match diverging requirements. Various techniques are available which could in principle be used for this purpose.

FIG. 1a schematically shows a typical RAM (Random Access Memory) device.

FIG. 1b shows a dual-port RAM which has two independent write/read ports that allow multiple reads or writes to occur at nearly the same time. However, dual-port RAM devices tend to have lower capacity, to need large chip areas, and to suffer from severe power consumption.

Thus, the existing convention techniques may have problems in that they either cannot provide the performance, operating speed and efficiency needed to comply with the requirements (in particular when using single-port devices), or they require high chip area and lead to high power consumption, thereby increasing the manufacturing and development costs (for instance when using dual-port devices or even multi-port units that have more than two ports). Moreover, the prior art techniques are often much too inflexible to allow for meeting the data throughput constraints given by modern applications. Thus, conventional techniques often do not allow for sufficiently compensating interface latencies.

SUMMARY OF THE INVENTION

An improved memory access technique that may be used in WLAN devices is provided, which may allow for compensating interface latencies, increase the overall operating speed and improve the efficiency, thereby simplifying the manufacturing, reducing chip area related costs and power consumption without performance loss.

In an embodiment, a WLAN communication device is provided that is adapted to be 802.11-compliant. The WLAN communication device comprises an on-chip memory which is adapted to buffer data frames that are received and/or to be transmitted by the WLAN communication device. The on-chip memory has separate, individually-addressable memory segments. The WLAN communication device further comprises at least one interface interfacing to at least one external device. The WLAN communication device further comprises an arbitration unit which is connected to the on-chip memory and the at least one interface to control access of multiple requesters to the separate, individually-addressable memory segments. At least one of the multiple requesters is the at least one external device.

In another embodiment, there is provided an integrated circuit chip which comprises an on-chip memory having multiple memory circuits forming individually-addressable memory segments, and an arbitration circuit. The arbitration circuit is adapted to arbitrate between multiple requesters, each requesting access to the on-chip memory. The requesters are on-chip circuits and/or external devices coupled to the integrated circuit chip. The arbitration circuit is adapted to determine, for each request received from a requester, a memory circuit to be accessed. The determination is based on a software configurable arbitration scheme.

In yet another embodiment, a memory device comprises an on-chip bank of single-port SRAM (Static Random Access Memory) devices. The on-chip bank of single-port SRAM devices has a data port and an address port. The address port is coupleable to an arbiter for having access of multiple requesters to the on-chip bank controlled by selecting at least one of these single-port SRAM devices and physically address memory cells in the selected single-port SRAM device.

According to a further embodiment, a method is provided for controlling access to an on-chip memory. Requests are received from multiple requesters to read data from and/or write data to the on-chip memory. It is determined which one of the received requests is to be served next. For the determined request, it is determined which one of multiple separate, individually-addressable memory segments of the one-chip memory is to be used. A memory cell is addressed in the determined memory segment to read or write data to or from the memory cell in compliance with the determined request.

In a still further embodiment, a computer readable storage medium stores instructions that, when executed by a processor, cause the processor to configure an arbiter to arbitrate between multiple requesters that are each requesting access to an on-chip memory which has multiple separate, individually-addressable memory segments. The arbitration is done by determining, for each request received from a requester, a memory segment to be accessed and addressing a memory cell in the determined memory segment to read to write data to or from said memory cell in compliance with the determined request.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1A:
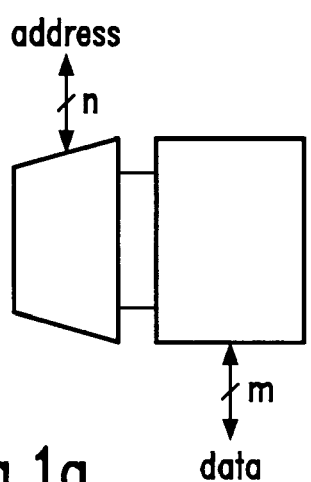
FIG. 1a is a schematic diagram of a conventional RAM device.
Figure 1B:
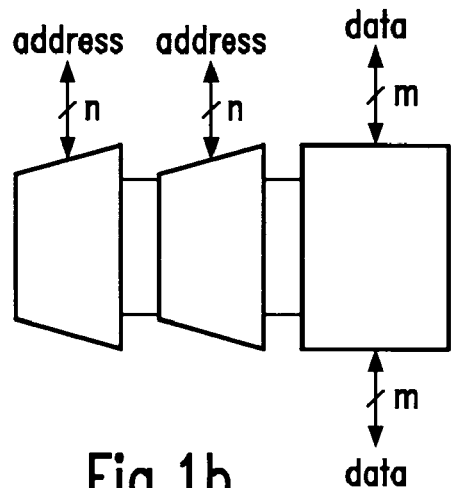
FIG. 1b schematically illustrates a conventional dual-port RAM device.
Figure 2:
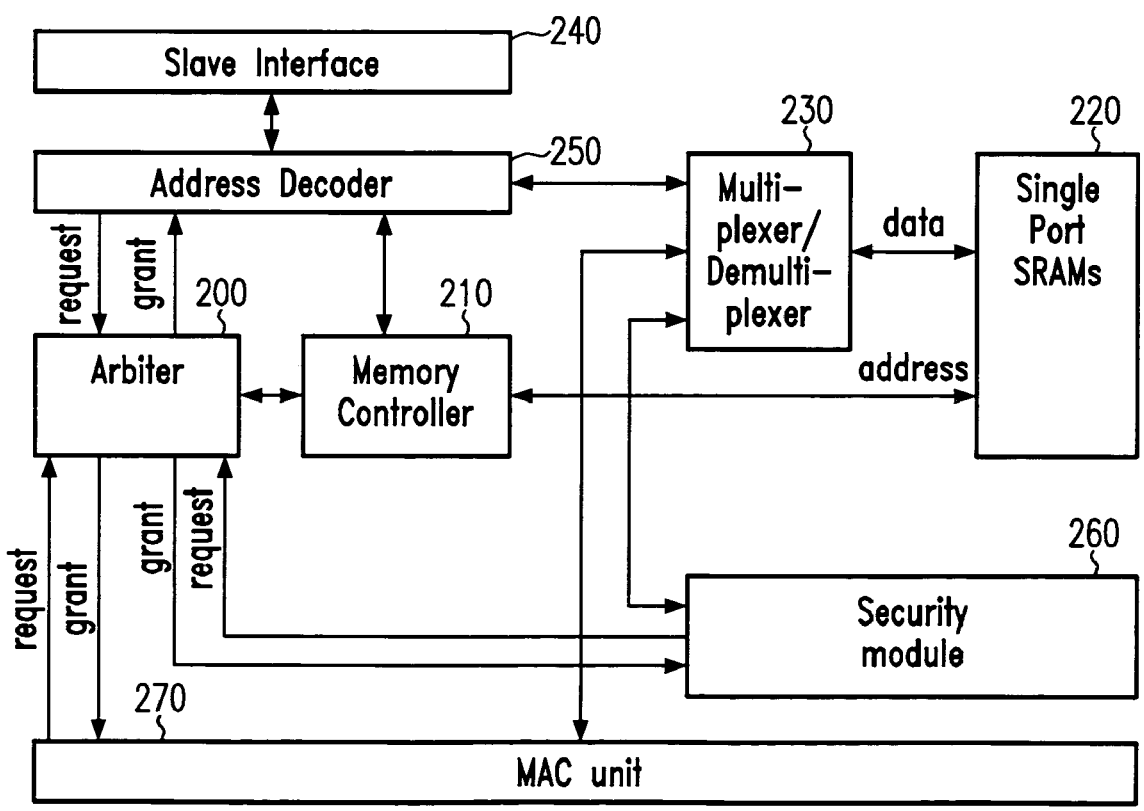
FIG. 2 is a block diagram illustrating an arrangement according to an embodiment, for controlling access of multiple requesters to an on-chip memory having single-port SRAMs.

Referring now to FIG. 2, an arrangement is shown for controlling access to an on-chip memory 220 by multiple requesters 240, 250; 260; 270. As may be seen from FIG. 2, the on-chip memory 220 of the present embodiment is built from single-port SRAM devices. Unlike DRAM (Dynamic Random Access Memory), SRAM-type memory devices do not need to be periodically refreshed. Moreover, SRAM is faster than DRAM.

Since the on-chip memory 220 of the present embodiment is built from single-port memory devices, the chip area needed to implement this technique is significantly reduced. In addition, the power consumption may be reduced as well.

The single-port SRAM based on-chip memory 220 is shown in FIG. 2 to have a data port and an address port. The data port is connected to a multiplexer/demultiplexer unit 230 that multiplexes and demultiplexes the data traffic received from and/or sent to the various requesting unit. As can be seen from the figure, the units may be external devices that are coupled to the arrangement by means of a slave interface 240 and an address decoder 250. Other requesters that are multiplexed/demultiplexed on the data path of the on-chip memory 220 may be internal devices such as a MAC (Media Access Control) unit 270 or a security module 260. In the embodiment, the security module 260 provides AES and/or TKIP data encryption functionality.

As will be described in greater detail below, the embodiments provide a technique that allows for handling both fast protocol timing (such as those required by a 802.11b/i compliant security module 260 and the MAC unit 270) and slow targets like SDIO, CF and others (which may be coupled by interface 240).

The address port of the single-port SRAM based on-chip memory 220 is connected in the arrangement of the embodiment of FIG. 2 to a memory controller 210. The memory controller 210 performs address translation between logical addresses and physical addresses. The logical addresses are those used by the requesters and by the software driving the requesters. The physical addresses are the addresses used at the address port of the on-chip memory 220.

The arrangement of FIG. 2 further comprises an arbiter 200 that receives requests from the requesters, controls access to the on-chip memory 220 via the memory controller 210, and issues grant signals to those requesters which have granted access.

When the arbiter 200 decides to grant access to an individual one of the requesters, by using one of several arbitration schemes, the arbiter 200 informs the memory controller 210 accordingly. The memory controller 210 has knowledge about which single-port SRAM device of the on-chip memory 220 is to be used, and has some control logic to address the memory. In the embodiment, the control logic comprises a configuration register that stores for each SRAM device information with respect to the buffer size, offset address and so on.

Figure 3:
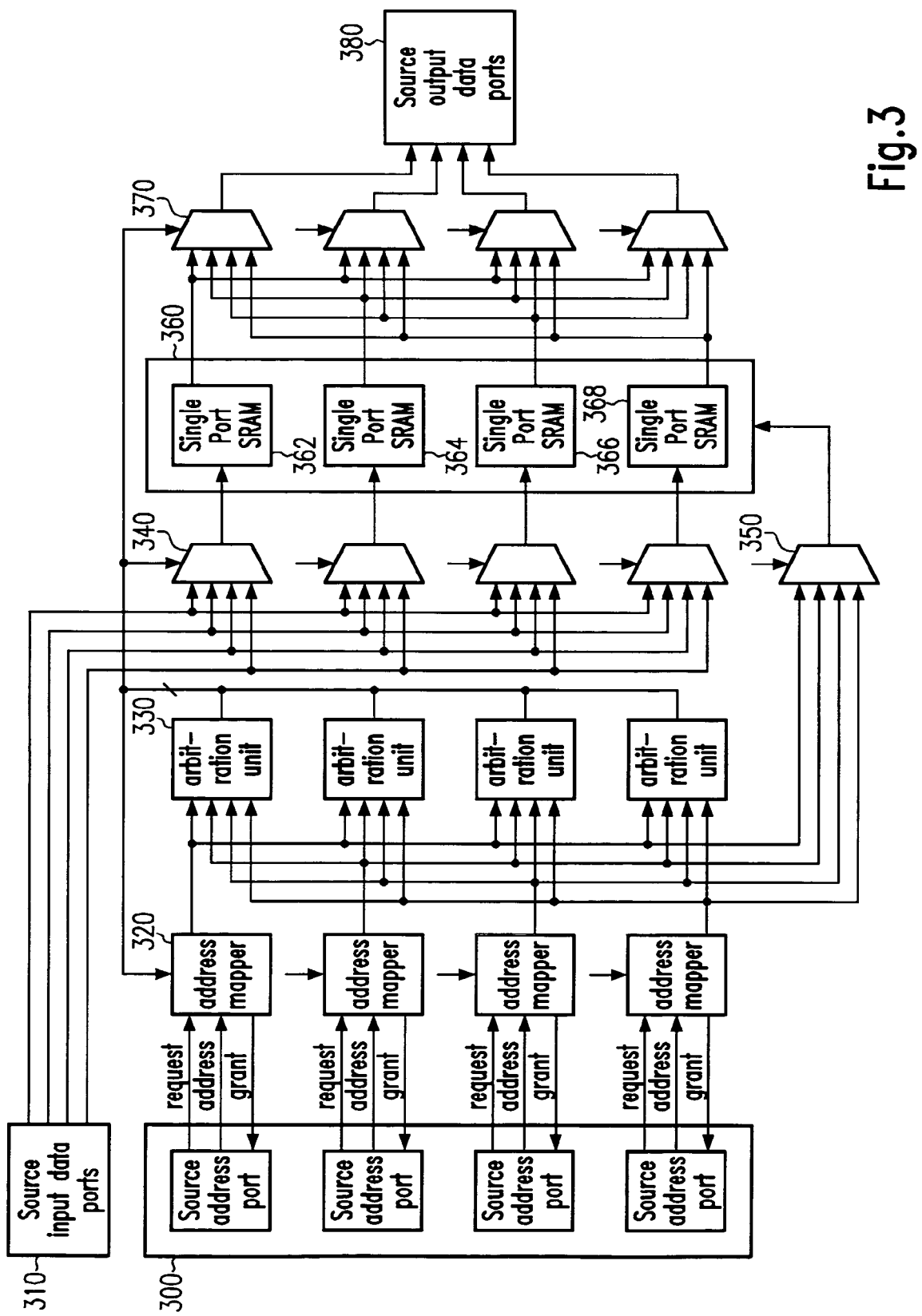
FIG. 3 is a diagram illustrating a memory and arbitration arrangement according to another embodiment.

Another embodiment is depicted in FIG. 3. In this embodiment, the (internal or external) requesters submit logical addresses to access the memory 360, using the address ports 300. For performing the data traffic to and from the various requesters, data ports 310, 380 are provided.

As can be further seen from FIG. 3, the memory 360 comprises a number of memory circuits 362-368 that form separate, individually addressable memory segments. Further, a control logic 320, 330, 340, 350, 370 is provided for arbitration, address mapping, and memory input/output selection.

In the embodiment of FIG. 3, the logical memory address is mapped to a physical memory address by the address mappers 320. Depending on a given address provided by one of the sources connected to the source address ports 300, an appropriate request signal is generated and applied to the respective arbitration unit 330.

As can be seen from FIG. 3, each address mapper 320 is connected to all of the arbitration units 330. The uppermost located arbitration unit is dedicated to receive and operate on requests to the uppermost memory circuit 362, irrespective of the source address port to which the respective requester is coupled. Thus, all requests to memory circuit 362 are dealt with by the first arbitration unit while any request to the second memory circuit 364 is dealt with by the second arbitration unit, and so on.

The address mapper 320 which has generated the request signal to the respective arbitration unit, further generates the physical address and provides this to the multiplexer 350 to access the memory 360. That is, the address mappers 320 are connected to the arbitration units 330 to communicate the requests, and to the multiplexer 350 to communicate the physical addresses.

The arbitration is done by the respective arbitration unit 330. As will be described in greater detail below, the arbitration might be done by implementing a priority hierarchy, or in a simple round robin manner, or with a combination of both.

If a source request is selected by the arbitration units 330, a grant signal is sent to the appropriate source. For this purpose, any arbitration unit 330 is connected to all of the address mappers 320 to cause the respective address mapper to produce the grant signal.

In compliance with the arbitration, multiplexers 340 are controlled to multiplex the data received from the requesters at the source input data source 310 to pass the data received from the selected requester to the memory circuit 360. If in a read mode, the demultiplexers 370 are accordingly controlled to pass the data requested by the selected requester to the respective source output data port 380.

That is, once a grant signal is sent to the appropriate source, the data, the physical address, and any control signals driven by the selected source are applied to the selected memory circuit. If the request of the source is dropped, the grant signal is de-asserted by the respective arbitration unit 330.

Figure 4:
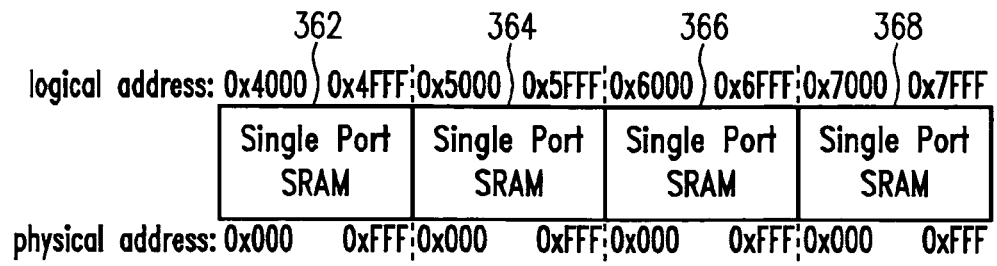
FIG. 4 illustrates the addressing scheme which may be used in an embodiment.

Referring now to FIG. 4, the address translation is discussed in more detail. As apparent from the figure, each memory segment, i.e. each single-port SRAM device 362-368, is addressable by a different logical address. The multiple different logical address spaces are arranged to form a continuous logical address space so that the physical structure of the memory is hidden to any software routine accessing the memory. For each segment 362-368 the physical addresses are in the same range in the present embodiment. The selection of memory segments 362-368 by the multiplexers 230, 340 and/or demultiplexers 230, 370 may be done as follows:

SGMT0_sel=ocm_addr<(buf_size/num_buf)
SGMT1_sel=ocm_addr>(buf_size/num_buf)*num_buf-3
&& ocm_addr<(buf_size/num_buf)*num_buf-2
SGMT2_sel=ocm_addr>(buf_size/num_buf)*num_buf-2
&& ocm_addr<(buf_size/num_buf)*num_buf-1
SGMT3_sel=ocm_addr>(buf_size/num_buf)*num_buf-1
&& ocm_addr<(buf_size/num_buf)*num_buf Apparently, the selection is also done based on the number of buffers, i.e. memory segments.

Figure 5:
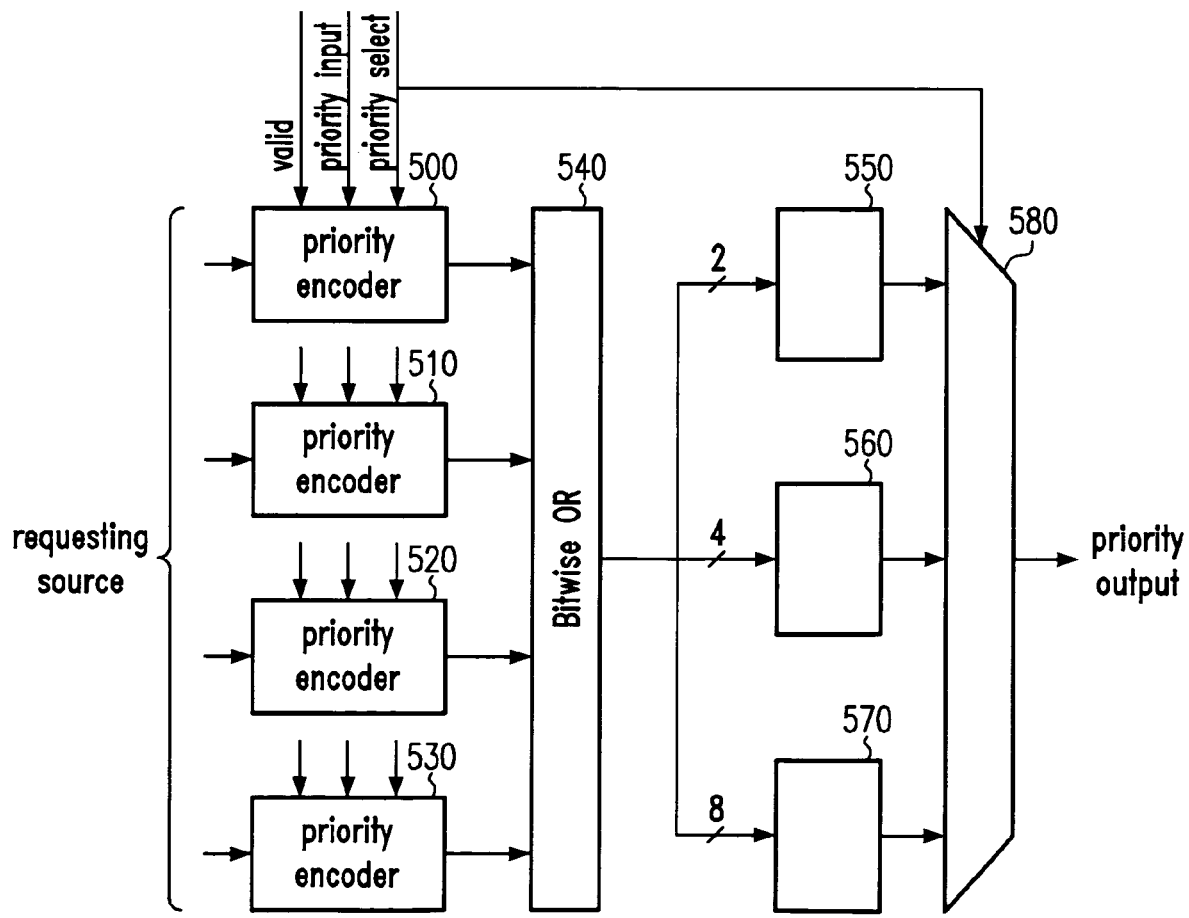
FIG. 5 is a block diagram illustrating an implementation of a priority based arbitration scheme which may be used in an embodiment.
Figure 6:
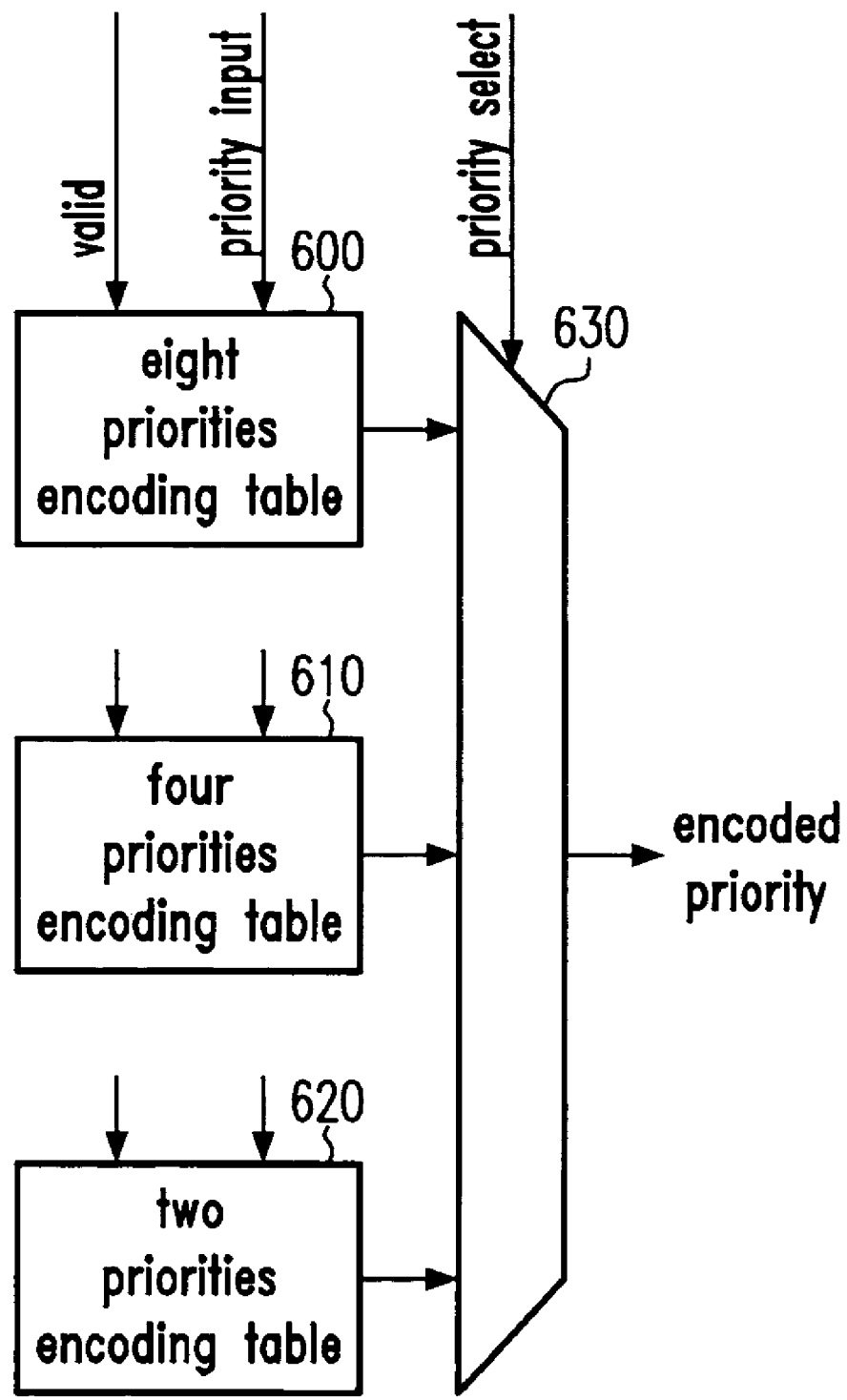
FIG. 6 illustrates the components of a priority encoder that may be used in the arrangement of FIG. 5.

Referring now to FIGS. 5 and 6, the arbitration units 200, 210, 330 of the embodiments may apply a priority based arbitration scheme according to which each of the multiple requesters is assigned a priority. Requesters that have been assigned higher priorities may be preferentially served. The priority based arbitration scheme may be further configured by software. Further, the priorities may be assigned by software.

As apparent from FIG. 5, four different priorities for four requesters are supported. Accordingly, four different priority encoders 500-530 are provided, the output of which are further processed by logic 540 and some post-processing mechanism 550-580. The priority encoders 500-530 of the present embodiment are depicted in greater detail in FIG. 6.

Accordingly, three different priority levels may be supported, one with eight priorities, one with four priorities, and one with just two priorities. For this purpose, three individual encoding tables 600-620 are provided which receive a priority input signal and output the respective values to a multiplexer 630. The multiplexer 630 selects the respective priority value and outputs the encoded priority. Referring back to FIG. 5, the post-processing may depend on this priority level, cf. units 550-570. The multiplexer 580 is then again controlled by the priority select signal.

As described above, other embodiments exist where this or a different priority based arbitration scheme is used, alone or in combination with a round robin arbitration scheme. Alternatively, a round robin arbitration scheme may be applied without using any priority based arbitration.

As apparent from the description of the various embodiments, an interface latency compensation mechanism is provided which makes use of on-chip memory segmentation. This technique allows for the use of simple single-port SRAM structures, thereby reducing costs and power consumption without performance loss. Further, as the arbitration may be configured by software with respect to the scheme concerning how access of multiple requesters to the various segments is performed, the data throughput can be flexibly adapted to the individual requirements. Thus, the overall operating speed and system efficiency may be improved. In other words, even though the embodiments may make use of single-port devices, there may be no performance problem as in conventional systems.

It is to be noted that not only the impact of interface latency with respect to the 802.11 protocol timing is minimized by the embodiments. Further, also the likelihood of arbitration can be reduced, e.g. by increasing the number of segments.

In the embodiments, the 802.11b/i protocol timing in particular is met, even when using slow target interfaces like SDIO or CF or the like, by implementing an on-chip memory for buffering frames that are provided by software. The frames may be either received frames or data frames that are to be transmitted. Also, the use of single-port SRAM devices may lead to higher access timing frequency (or rates) due to their size and power conditions and in view of the shared interface. As described above, the likelihood of accessing an SRAM segment might be decreased by increasing the number of segments.

According to an embodiment, the arbitration module may be programmable by software and controls the access of different sources. The source with the highest priority gets served first. Depending on the programming, the throughput may be optimized with respect to the selected interface on the host size (i.e., the hosting computer system such as a PDA) and the security interface as well. Moreover, the architecture of the embodiments allows for the addition of more sources (or interfaces) which may request to access the on-chip memory.

As described above, the on-chip memory implemented according to the embodiments may be used to store data to be transmitted as well as received data. In an embodiment, one of the memory segments is specifically dedicated to forming a receive buffer.

It is to be noted that the number of requesters, i.e. sources, need not be the same as the number of memory segments, i.e. single-port SRAM devices. That is, the number of requesters may be different from the number of memory circuits in an embodiment.

The fact that the likelihood of arbitration may be decreased is the result of providing a number of physically separate memory segments. The more memory segments are available, the less is the likelihood of arbitration. The use of a priority based arbitration scheme may remove the necessity to perform round robin arbitration within one priority level. Moreover, in an embodiment, the address space accessed by the source is programmable by software so that certain memory segments may be assigned to only one source. This may give a maximum of flexibility, depending on the timing requirements of a source, e.g. with respect with latency and bandwidth.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) communication device adapted to be 802.11 compliant, the WLAN communication device comprising:
    an on-chip memory adapted to buffer data frames received and/or to be transmitted by the WLAN communication device, said on-chip memory having separate, individually addressable memory segments, wherein said separate, individually addressable memory segments are physical memory segments;
    at least one interface interfacing to at least one external device; and
    an arbitration unit connected to said on-chip memory and said at least one interface to control access of multiple requesters to the separate, individually addressable memory segments, at least one of said multiple requesters being said at least one external device.

2. The WLAN communication device of claim 1, being 802.11b and/or 802.11i compliant.

3. The WLAN communication device of claim 1, wherein said at least one external device comprises an SD (Secure Digital) media type device.

4. The WLAN communication device of claim 1, wherein said at least one external device comprises a CF (Compact Flash) media type device.

5. The WLAN communication device of claim 1, wherein each separate, individually addressable memory segment comprises an individual SRAM (Static Random Access Memory) device.

6. The WLAN communication device of claim 5, wherein each individual SRAM device is a single-port SRAM device.

7. The WLAN communication device of claim 1, wherein at least two of said separate, individually addressable memory segments are single-port RAM (Random Access Memory) devices.

8. The WLAN communication device of claim 1, wherein each of said separate, individually addressable memory segments is addressable by the same physical address space.

9. WLAN communication device of claim 8, wherein each of said separate, individually addressable memory segments is addressable by a different logical address space.

10. The WLAN communication device of claim 9, wherein the multiple different logical address spaces are arranged to form a continuous logical address space so that the physical structure of said on-chip memory comprising said memory segments is hidden to any requester requesting access to the memory.

11. The WLAN communication device of claim 1, wherein at least one of said memory segments is reserved to form a buffer for received data frames.

12. The WLAN communication device of claim 1, wherein said arbitration unit comprises a memory controller adapted to select, for each individual requester being served, a respective memory segment.

13. The WLAN communication device of claim 12, wherein said memory controller comprises a configuration register storing segment information accessible to select the memory segments.

14. The WLAN communication device of claim 13, wherein said configuration register is configurable by software.

15. The WLAN communication device of claim 12, wherein said memory controller is adapted to perform address translation to translate logical addresses to physical addresses, said memory controller being connected to said on-chip memory to provide said physical addresses to said on-chip memory.

16. The WLAN communication device of claim 1, wherein said arbitration unit comprises a set of address mapping units adapted to perform address translation to translate logical addresses to physical addresses.

17. The WLAN communication device of claim 16, wherein said arbitration unit further comprises a set of arbitration subunits each adapted to control access of said multiple requesters to an individual one of said memory segments.

18. The WLAN communication device of claim 17, wherein each of said arbitration subunits is connected to all of said address mapping units to receive memory read and/or write requests.

19. The WLAN communication device of claim 17, wherein each of said arbitration subunits is connected to all of said address mapping units to cause any address mapping unit that performs address translation for a requester which is selected to get memory access to send a grant signal to the respective requester.

20. The WLAN communication device of claim 19, wherein the arbitration subunits and address mapping units are adapted to de-assert a grant signal if a corresponding memory read and/or write request is dropped.

21. The WLAN communication device of claim 16, wherein said address mapping units are adapted to perform said address translation dependent on the number of memory segments in said on-chip memory.

22. The WLAN communication device of claim 1, further comprising an address decoder connected to said at least one interface, said address decoder being adapted to decode addresses and perform data transfer to and/or from said on-chip memory.

23. The WLAN communication device of claim 1, further comprising a multiplexer/demultiplexer unit to multiplex and/or demultiplex data received from and/or sent to said multiple requesters accessing said on-chip memory.

24. The WLAN communication device of claim 1, wherein at least one of said multiple requesters is a security module of said WLAN communication device.

25. The WLAN communication device of claim 24, wherein said security module is adapted to apply the ABS (Advanced Encryption Standard) data encryption scheme.

26. The WLAN communication device of claim 24, wherein said security module is adapted to apply the TKIP (Temporal Key Integrity Protocol) data encryption scheme.

27. The WLAN communication device of claim 1, wherein at least one of said multiple requesters is a MAC (Medium Access Control) unit of said WLAN communication device.

28. The WLAN communication device of claim 1, wherein the data frames buffered by said on-chip memory are provided by at least one of said multiple requesters, either by software or by hardware.

29. The WLAN communication device of claim 1, wherein said arbitration unit is adapted to operate according to an arbitration scheme configurable by software.

30. The WLAN communication device of claim 29, wherein said arbitration scheme is configurable to adapt arbitration to throughput requirements relating to data traffic originating from at least some of said multiple requesters.

31. The WLAN communication device of claim 30, wherein said at least some of said multiple requesters comprise at least one external device.

32. The WLAN communication device of claim 30, wherein said at least some of said multiple requesters comprise a security module of the WLAN communication device.

33. The WLAN communication device of claim 29, wherein said arbitration scheme is configurable to adapt to a varying number of requesters.

34. The WLAN communication device of claim 29, wherein at least one of said memory segments is preferentially assigned to only one of said multiple requesters.

35. The WLAN communication device of claim 1, wherein said arbitration unit is adapted to operate according to a round robin arbitration scheme.

36. The WLAN communication device of claim 1, wherein said arbitration unit is adapted to operate according to a priority based arbitration scheme where each of said multiple requesters is assigned a priority.

37. The WLAN communication device of claim 36, wherein requesters having assigned higher priorities are preferentially served.

38. The WLAN communication device of claim 36, wherein said priority based arbitration scheme is configurable by software.

39. The WLAN communication device of claim 36, wherein said priorities are assignable by software.

40. The WLAN communication device of claim 36, wherein said priority based arbitration scheme is configurable with respect to the number of priority levels available.

41. The WLAN communication device of claim 36, wherein said arbitration unit is further adapted to operate according to a round robin arbitration scheme.

42. An integrated circuit chip comprising:
an on-chip memory having multiple memory circuits forming individually addressable memory segments; and
an arbitration circuit adapted to arbitrate between multiple requesters each requesting access to said on-chip memory, said requesters being on-chip circuits and/or external devices coupled to said integrated circuit chip, said arbitration circuit adapted to determine, for each request received from a requester, a memory circuit to be accessed, wherein said determination is based on a software configurable arbitration scheme.

43. The integrated circuit chip of claim 42, wherein each memory circuit comprises an SRAM (Static Random Access Memory) circuit.

44. The integrated circuit chip of claim 43, wherein each SRAM device is a single-port SRAM circuit.

45. The integrated circuit chip of claim 42, wherein at least two of said memory circuits are single-port RAM (Random Access Memory) circuits.

46. The integrated circuit chip of claim 42, wherein each of said separate, individually addressable memory segments is addressable by the same physical address space.

47. The integrated circuit chip of claim 46, wherein each of said memory circuits is addressable by a different logical address space.

48. The integrated circuit chip of claim 47, wherein the multiple different logical address spaces are arranged to form a continuous logical address space so that the physical structure of said on-chip memory comprising said memory circuits is hidden to any requester requesting access to the memory.

49. The integrated circuit chip of claim 42, wherein said arbitration circuit comprises a memory control circuit adapted to select, for each individual requester being served, a respective memory circuit.

50. The integrated circuit chip of claim 49, wherein said memory control circuit comprises a configuration register storing segment information accessable to select the memory circuits.

51. The integrated circuit chip of claim 49, wherein said memory control circuit is adapted to perform address translation to translate logical addresses to physical addresses, said memory control circuit being connected to said on-chip memory to provide said physical addresses to said on-chip memory.

52. The integrated circuit chip of claim 42, wherein said arbitration circuit comprises a set of address mapping circuit adapted to perform address translation to translate logical addresses to physical addresses.

53. The integrated circuit chip of claim 52, wherein said arbitration circuit further comprises a set of arbitration sub-circuits each adapted to control access of said multiple requesters to an individual one of said memory circuits.

54. The integrated circuit chip of claim 53, wherein each of said arbitration sub-circuits is connected to all of said address mapping units to receive memory read and/or write requests.

55. The integrated circuit chip of claim 53, wherein each of said arbitration sub-circuits is connected to all of said address mapping units to cause any address mapping circuits that performs address translation for a requester which is selected to get memory access to send a grant signal to the respective requester.

56. The integrated circuit chip of claim 55, wherein the arbitration sub-circuits and address mapping circuits are adapted to de-assert a grant signal if a corresponding memory read and/or write request is dropped.

57. The integrated circuit chip of claim 52, wherein said address mapping circuits are adapted to perform said address translation dependent on the number of memory circuits in said on-chip memory.

58. The integrated circuit chip of claim 42, further comprising an address decoder connected to said at least one interface, said address decoder being adapted to decode addresses and perform data transfer to and/or from said on-chip memory.

59. The integrated circuit chip of claim 42, further comprising a multiplexer/demultiplexer circuit to multiplex and/or demultiplex data received from and/or sent to said multiple requesters accessing said on-chip memory.

60. The integrated circuit chip of claim 42, wherein said arbitration scheme is configurable by software to adapt arbitration to throughput requirements relating to data traffic originating from at least some of said multiple requesters.

61. The integrated circuit chip of claim 42, wherein at least one of said requesters is a security module.

62. The integrated circuit chip of claim 42, wherein at least one of said requesters is a MAC (Medium Access Control) circuit.

63. The integrated circuit chip of claim 42, wherein said arbitration scheme is configurable by software to adapt to a varying number of requesters.

64. The integrated circuit chip of claim 42, wherein at least one of said memory circuits is preferentially assigned to only one of said multiple requesters.

65. The integrated circuit chip of claim 42, wherein said arbitration scheme is a round robin arbitration scheme.

66. The integrated circuit chip of claim 42, wherein said arbitration scheme is a priority based arbitration scheme where each of said multiple requesters is assigned a priority.

67. The integrated circuit chip of claim 66, wherein requesters having assigned higher priorities are preferentially served.

68. The integrated circuit chip of claim 66, wherein said priorities are assignable by software.

69. The integrated circuit chip of claim 66, wherein said priority based arbitration scheme is configurable with respect to the number of priority levels available.

70. The integrated circuit chip of claim 66, wherein said arbitration unit is further adapted to operate according to a round robin arbitration scheme.

71. A memory device comprising:
an on-chip bank of single-port SRAM (Static Random Access Memory) devices,
wherein said on-chip bank of single-port SRAM devices has a data port and an address port, said address port coupleable to an arbiter for having access of multiple requesters to said on-chip bank controlled by selecting at least one of said single-port SRAM devices and physically address memory cells in the selected single-port SRAM device.

72. A method of controlling access to an on-chip memory, comprising:
receiving requests from multiple requesters to read data from and/or write data to said on-chip memory;
determining which one of the received requests is to be served next;
for the determined request, determining which one of multiple separate, individually addressable memory segments of said on-chip memory is to be used, wherein said separate, individually addressable memory segments are physical memory segments; and
addressing a memory cell in the determined memory segment to read or write data to or from said memory cell in compliance with the determined request.

73. A computer readable storage medium storing instructions that, when executed by a processor, cause said processor to configure an arbiter to arbitrate between multiple requesters each requesting access to an on-chip memory having multiple separate, individually addressable memory segments by determining, for each request received from a requester, a memory segment to be accessed and addressing a memory cell in the determined memory segment to read or write data to or from said memory cell in compliance with the determined request.

* * * * *

UNITED STATES PATENT AND TRADEMARK OFFICE
CERTIFICATE OF CORRECTION

PATENT NO. : 7,461,191 B2  Page 1 of 1
APPLICATION NO. : 11/106766
DATED : December 2, 2008
INVENTOR(S) : Matthias Baer et al.

It is certified that error appears in the above-identified patent and that said Letters Patent is hereby corrected as shown below:

In the Claims:

Claim 25, col. 8, line 63, please change "ABS" to "AES".

Signed and Sealed this

Seventeenth Day of March, 2009

JOHN DOLL
*Acting Director of the United States Patent and Trademark Office*